(12) United States Patent
Mohr et al.

(10) Patent No.: US 6,672,983 B2
(45) Date of Patent: Jan. 6, 2004

(54) POWER TRANSMISSION DRIVE SYSTEM

(75) Inventors: John Alan Mohr, Lincoln, NE (US); Jeffery Dwight Lofgren, Lincoln, NE (US); Vinod Pius Raju, Lincoln, NE (US); Travis Ray Toline, Lincoln, NE (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/746,455

(22) Filed: Dec. 21, 2000

(65) Prior Publication Data

US 2002/0119854 A1 Aug. 29, 2002

(51) Int. Cl.[7] .............................................. B65G 23/06
(52) U.S. Cl. ...................... 474/152; 474/153; 474/190; 474/268
(58) Field of Search ................... 474/142, 143, 474/148, 151, 152, 153, 167, 188, 189, 190, 184, 185, 186, 187, 263, 268

(56) References Cited

U.S. PATENT DOCUMENTS

| | | | | |
|---|---|---|---|---|
| 376,174 A | * | 1/1888 | Adamson | 474/152 X |
| 1,149,625 A | * | 8/1915 | Brown | 474/149 X |
| 3,010,332 A | | 11/1961 | Skates | 74/230.7 |
| 3,140,621 A | | 7/1964 | Stone | 74/230.3 |
| 3,142,192 A | | 7/1964 | Edberg | 74/230.7 |
| 3,216,273 A | * | 11/1965 | Colmer, Jr. | 474/268 X |
| 3,368,728 A | | 2/1968 | Gudmestad | 226/172 |
| 3,719,098 A | | 3/1973 | Graves | 74/216.5 |
| 3,729,078 A | | 4/1973 | Kincaid et al. | 192/105 |
| 3,744,329 A | | 7/1973 | Frank | 74/230.1 |
| 3,763,714 A | | 10/1973 | Kahmann | 74/230.3 |
| 3,772,928 A | | 11/1973 | Gobeille | 74/230.7 |
| 3,789,682 A | | 2/1974 | Holz | 74/230.7 |
| 3,946,618 A | | 3/1976 | Green | 74/230.5 |
| 3,965,765 A | | 6/1976 | Vaillette et al. | 74/230.5 |
| 3,978,976 A | | 9/1976 | Kamp | 198/617 |
| 4,023,250 A | * | 5/1977 | Sproul et al. | 474/174 |
| 4,233,853 A | | 11/1980 | Holz | 74/185 |
| 4,421,124 A | | 12/1983 | Marshall | 128/782 |

(List continued on next page.)

FOREIGN PATENT DOCUMENTS

| | | | | |
|---|---|---|---|---|
| AU | 8816370 | | 9/1998 | F16D/69/00 |
| AU | 9861994 | | 10/1998 | F16D/69/02 |
| DE | 4118862 A1 | * | 10/1992 | |
| EP | 0825363 | | 2/1998 | F16H/55/36 |
| EP | 0922886 | | 6/1999 | F16H/55/48 |
| FR | 2686959 | * | 3/1992 | |
| GB | 2158180 | | 11/1985 | F16H/7/02 |
| GB | 2066908 | | 7/1991 | F16H/9/12 |
| JP | 11139522 | | 5/1999 | B65G/15/32 |
| WO | 0163145 A | | 8/2001 | F16G/5/20 |

OTHER PUBLICATIONS

Ober, Erick; Jones, Franklin D.; Horton, Holbrook L.; Ryffell, Henry H: 26th Edition Machinery's Handbook. Industrial Press Inc., New York, 2000.*

Research Disclosure No. 262, Feb. 1986, XP002194219 Emsworth, Hampshire, GB, "Two Pulley Belt Drive System with Driver and Idler Surface Friction Differential".

Primary Examiner—David A. Bucci
Assistant Examiner—Colby Hansen
(74) Attorney, Agent, or Firm—Nancy T. Krawczyk

(57) ABSTRACT

A drive system comprising a driver pulley, a driven pulley (22), and a belt (10). The belt (10) has a pulley engaging surface (16) comprised of a plurality of transversely extending self-tracking teeth (18). The driven pulley (22) has a non-grooved, crownless belt engaging surface (24). The material (20) forming the pulley engaging surface (16) of the belt (10) having a relatively low coefficient of friction, and the material (28) forming the belt engaging surface (24) of the driven pulley (22) having a relatively high coefficient of friction.

5 Claims, 2 Drawing Sheets

U.S. PATENT DOCUMENTS

| | | | | |
|---|---|---|---|---|
| 4,439,173 A | | 3/1984 | Fokos | 474/191 |
| 4,494,946 A | * | 1/1985 | Wilcox | 474/242 X |
| 4,553,951 A | * | 11/1985 | Pavone | 474/148 |
| 4,584,951 A | | 4/1986 | Kuhnis et al. | 112/97 |
| 4,589,543 A | * | 5/1986 | Hastem-Muller | 474/153 X |
| 4,589,861 A | | 5/1986 | Dodge | 474/178 |
| 4,634,409 A | * | 1/1987 | Johnson et al. | 474/152 |
| 4,721,496 A | * | 1/1988 | Yokoyam et al. | 474/263 X |
| 4,781,664 A | | 11/1988 | Imamura | 474/87 |
| 4,832,674 A | | 5/1989 | Takemoto et al. | 474/903 |
| 4,878,411 A | | 11/1989 | Laskowski et al. | 83/820 |
| 4,979,928 A | | 12/1990 | Lindsay | 474/166 |
| 4,995,855 A | | 2/1991 | Hasebe et al. | 474/167 |
| 5,019,019 A | | 5/1991 | Jones | 474/266 |
| 5,106,672 A | | 4/1992 | Rabe | 428/213 |
| 5,119,924 A | * | 6/1992 | Kaminski | 474/167 X |
| 5,129,866 A | * | 7/1992 | Schanin et al. | 474/268 X |
| 5,209,705 A | | 5/1993 | Gregg | 474/204 |
| 5,244,618 A | | 9/1993 | Kemerer et al. | 264/166 |
| 5,284,457 A | | 2/1994 | Gerstenberger et al. | 474/95 |
| 5,344,369 A | | 9/1994 | Kitahama et al. | 474/253 |
| 5,346,438 A | | 9/1994 | Gerstenberger et al. | 474/151 |
| 5,411,444 A | | 5/1995 | Nakamura et al. | 474/148 |
| 5,415,594 A | | 5/1995 | Kitahama et al. | 474/263 |
| 5,417,619 A | | 5/1995 | Tajima et al. | 474/260 |
| 5,421,789 A | * | 6/1995 | Gregg | 474/153 |
| 5,607,039 A | | 3/1997 | Byers et al. | 193/37 |
| 5,704,861 A | * | 1/1998 | Feuerborn | 474/153 |
| 5,704,862 A | | 1/1998 | Janne et al. | 474/168 |
| 5,878,855 A | | 3/1999 | Miyata | 192/41 R |
| 5,987,952 A | | 11/1999 | Kutzscher et al. | 72/71 |

* cited by examiner

POWER TRANSMISSION DRIVE SYSTEM

FIELD OF THE INVENTION

The present invention is directed to a pulley and belt combination and a drive system incorporating the pulley and belt.

BACKGROUND OF THE INVENTION

Pulley and belt combinations are well known and there are many different types of belts and many different combinations of belts and pulleys. The belt application typically determines the belt construction, while the belt construction is a factor in the pulley construction. If the inner face of the belt is comprised of teeth, then the outer face of the drive pulley, which contacts the inner face of the belt, is conventionally formed with grooves corresponding to the tooth profile of the belt. For synchronous drive belts wherein the teeth extend laterally across the width of the belt, the corresponding pulleys are provided with flanges to prevent the belt from travelling off of the pulley. For drive belts with self-tracking tooth profiles, i.e. a profile that results in the belt automatically tracking to one position on the correspondingly grooved pulley, the pulleys do not require flanges to restrain the axial movement of the belt. If the inner face of the belt is toothless, then the outer face of the pulley is correspondingly grooveless.

A simplistic description of a timing belt system is that the system consists of a toothed timing belt, a driver pulley which is powered to drive the timing belt, and a driven pulley about which the timing belt travels. To reduce tooth abrasion of the belt, and improve belt wear and belt life, the coefficient of friction between the belt and pulley is reduced as much as possible. A low coefficient of friction does not alter the performance of the drive system, as the belt is driven, not by friction, but by the positive engagement between the timing belt and pulley teeth. Conventionally, the surface material of the driven pulley, the non-powered pulley, is also selected for a low coefficient of friction between the belt and the pulley, and again, the belt is driven by the engagement between the belt and pulley teeth. In such a timing belt system, it is easy to achieve the desired coefficients of friction between the timing belt and both of the pulleys since the entire system is predominantly driven by the positive engagement of the mating surfaces of the belt and pulleys.

However, to achieve the goals of reduced space and minimized noise in a drive system, the present invention utilizes both a toothed driver pulley and a flat toothless driven pulley with a timing belt. It is known to drive a synchronous drive belt on a driven pulley that has no corresponding grooves. However, to maintain the belt on the pulley, the pulley is provided with either flanges to restrain the lateral edges of the belt or the pulley is provided with a crowned surface to encourage the belt to travel along the central portion of the pulley (see U.S. Pat. Nos. 4,979,928 and 4,589,861). A combination of flanges and a crowned pulley surface may also be used to restrain the belt as it travels about the pulley. Additionally, because of the reduced contact between the toothed belt surface and the grooveless pulley surface, the belt and pulley combination is provided with enough wrap to enable the drive pulley to properly drive the belt. Another way to achieve the proper torque in the drive system is to modify the belt surface for an increased coefficient of friction. However, in the present invention the belt surface must be formed from a material that provides a low coefficient of friction with the driver pulley surface; creating conflicting requirements for the construction of the belt.

GB 2158180 discloses a belt drive arrangement wherein pulleys are driven off both the front and the back of a toothed belt. The belt contact surface of the back driven pulley is provided with a rubber material to produce a high coefficient of friction between the pulley surface and the material of the toothless back of the belt. However, the inside surface of the belt is provided with teeth to provide a positive engagement with a corresponding grooved drive pulley.

SUMMARY OF THE INVENTION

The present invention is directed toward a drive system comprising a drive belt, a driven pulley, and a driver pulley wherein the combination is modified to minimize noise when in operation.

The belt has a pulley engaging surface which contacts both the surface of the driver pulley and contacts the belt engaging surface of the driven pulley. The driven pulley has a non-grooved, crownless belt engaging surface.

In an aspect of the invention, the material forming the pulley engaging surface of the belt has a relatively low coefficient of friction, and the material forming the belt engaging surface of the driven pulley has a relatively high coefficient of friction.

In another aspect of the invention, the material forming the pulley engaging surface of the belt has a coefficient of friction of not more than 0.45.

In another aspect of the invention, the material forming the belt engaging surface of the driven pulley has a coefficient of friction of 0.45 or greater.

BRIEF DESCRIPTION OF THE DRAWINGS

The invention will be described by way of example and with reference to the accompanying drawings in which.

DETAILED DESCRIPTION OF THE PREFERRED EMBODIMENTS

Figure 1:
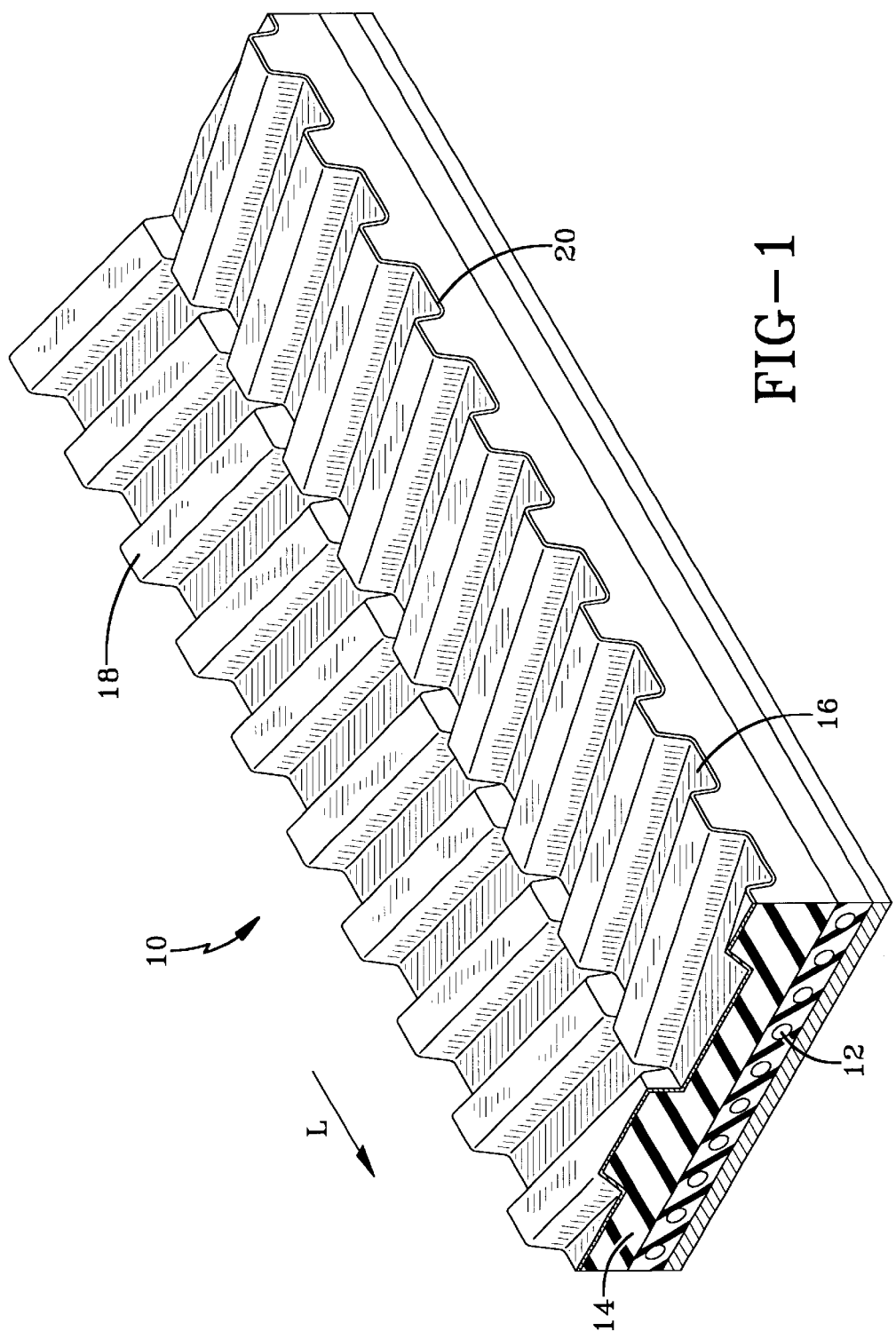
FIG. 1 illustrates a synchronous drive belt.

FIG. 1 illustrates a synchronous drive belt 10 made of a resilient elastomer and reinforced with a longitudinal tensile member 12 comprising cords of a high elastic modulus. The cords 12 may be made from glass fiber, carbon fiber, steel, polyester, high tenacity rayon or preferably, polyaramide. The elastomer used to form the body 14 of the belt 10 may be any one of those known to be suitable for use in such belts, e.g., polychloroprene, polyurethane, NBR, IIR, IR, SBR, CSM, EPDM, other thermosets, thermoplastic elastomers, and other polymer alloys.

The inside surface 16 of the belt 10 may be reinforced with an abrasion resistant fabric (not illustrated), depending upon the end use of the belt 10. The inside surface 16 of the belt 10 has a series of self-tracking teeth 18. The teeth 18 may be formed in a v-pattern or an angled offset pattern. Preferably, the inside surface 16 is provided with at least two transversely adjacent rows of teeth 18 which are at oppositely balanced oblique angles to the longitudinal direction L of the belt 10 and wherein the centerlines of the teeth 18 in the adjacent rows are offset from each other by a distance of up to 10% to 90% of their pitch. That is, preferably, the teeth 18 on the inside surface of the belt 10 have a configuration similar to that disclosed in U.S. Pat. No. 5,209,705. The corresponding configuration of the belt teeth 18 and the grooves formed on the driver pulley minimizes noise of the belt and pulley combination when in operation in comparison to other known belt configurations.

The inside surface 16 of the belt is also known as the pulley engaging surface of the belt 10. In the present invention, the material 20 comprising the outermost surface of the pulley engaging surface 16 of the belt has a low coefficient of friction. The material 20 has a coefficient of friction of not more than 0.45. Materials include, but are not limited to, high density polyethylene, halogenated rubber, polyvinyldiene fluoride, or any of these materials compounded with friction modifiers such as Teflon, graphite, or molybdenum disulfide.

Figure 2:
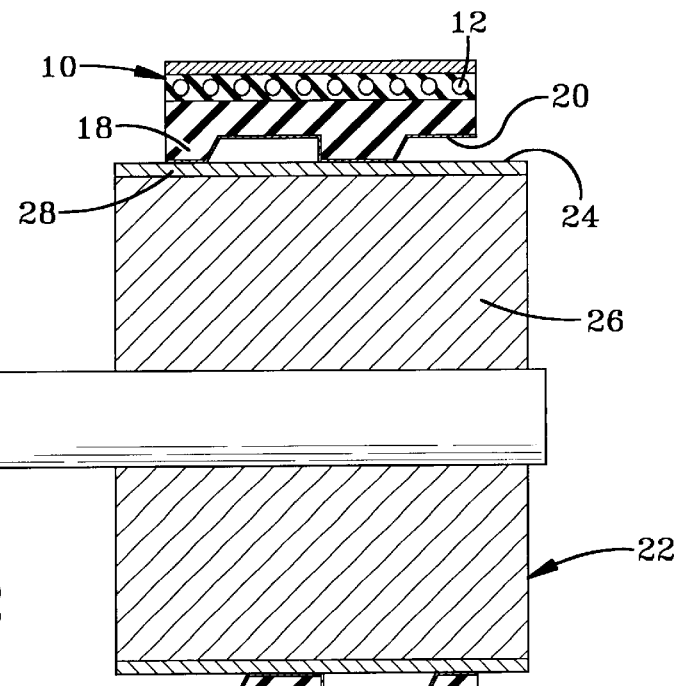
FIG. 2 is a cross-sectional view of a drive belt wound about a pulley.
Figure 3:
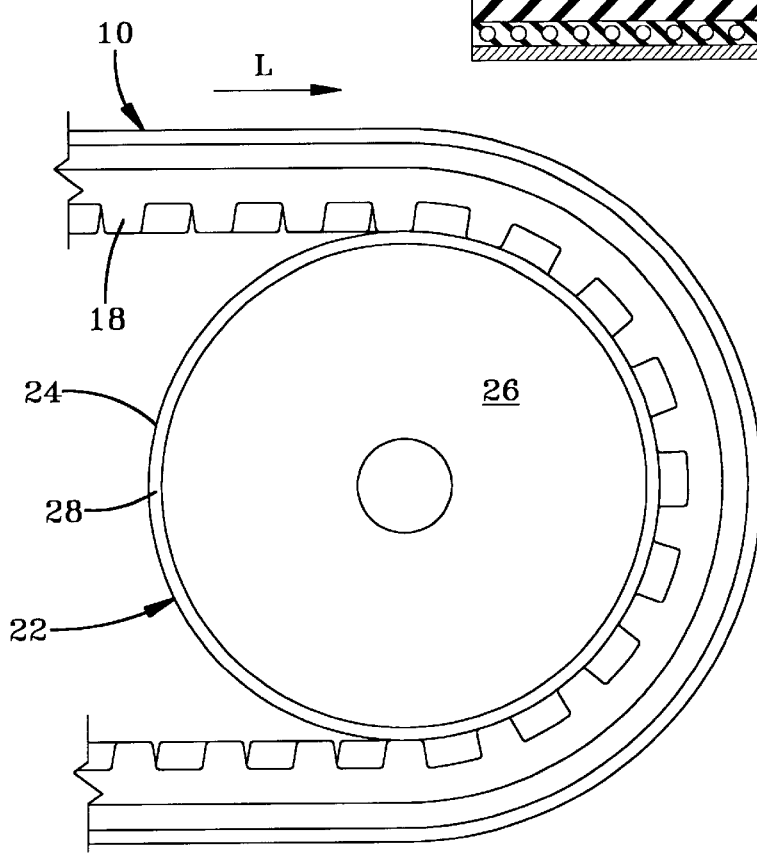
FIG. 3 is a side view of a drive belt wound about a pulley.

As previously discussed, the belt surface 20 should have a low coefficient of friction between itself and the surface of the driver pulley; this should preferably be in the range of 0.20 to 0.45. In the present invention, the timing belt 10 is wound around both a driver pulley and a driven pulley. The driver pulley is of the conventional construction, having a tooth configuration mating with the tooth configuration of the belt, and for the illustrated belt 10 the driver pulley has the configuration as disclosed in U.S. Pat. No. 5,209,705. Dissimilar from conventional drive systems, in accordance with the present invention, to reduce noise and space within the drive system, the driven pulley is toothless, as illustrated in FIGS. 2 and 3.

The driven pulley 22 has a belt engaging surface 24. The belt engaging surface 24 is flat, i.e. crownless. To minimize the space requirements of the drive system, the driven pulley 22 is also flangeless. The body 26 of the driven pulley 22 may be formed from conventional metal, thermoplastic, or thermosetting materials. With the crownless and flangeless driven pulley, a high coefficient of friction, preferably 0.45 or greater, between the belt engaging surface 24 of the driven pulley 22 and the pulley engaging surface 20 of the belt 10 is desired. Since the belt surface 20 must also achieve a low coefficient of friction with the driver pulley (not illustrated), the desired results can only be achieved by particularly selecting the material 28 which forms the belt engaging surface 24.

The surface 24 of the pulley 22 is coated with a material 28 having a high coefficient of friction. The material 28 has a coefficient of friction of 0.45 or greater. The material 28 should maintain a high coefficient of friction even after prolonged use and under high working temperatures. Any thermoplastic, elastomer, or thermoplastic elastomer which has a coefficient of friction greater than 0.45 will be suitable for the present invention.

Comparison Testing

Two different self-tracking belts were manufactured. The first belt was prepared with a high density polyethylene tooth surface material, the material having a dynamic coefficient of friction of 0.40. The second belt was prepared with a tooth surface material having a dynamic coefficient of friction of 0.29. Both belts were first run on a drive system having a grooved driver pulley and a grooved driven pulley, the tooth patterns of the pulleys corresponding to the tooth configuration of the belt. The driven pulleys were not provided with any coating material for increased coefficient of friction; thus the surfaces had a static coefficient of friction corresponding to the materials forming the pulley bodies. For this test, the pulleys were formed from aluminum, thus having a low coefficient of friction, as would be conventionally desired. The noise characteristics of the drive system were determined.

Crownless and flangeless, non-grooved driven pulleys were also prepared. The belt engaging surfaces of the pulleys were coated with a high coefficient of friction coating material. The two differently coated belts were run on the coated pulleys. The same driver pulleys were used as in the previous systems tests. The noise characteristics of the drive system were determined.

For each of the tests run, the drive system was operated at 760 rpm with a tooth engagement frequency of 1342 hz. The noise at tooth engagement frequency was measured with a microphone and a sound meter at a distance of two inches from the center span of the belt.

|  | System 1 | System 2 | System 3 | System 4 |
|---|---|---|---|---|
| Belt Facing Material | HDPE | Solef[1] | HDPE | Solef[1] |
| Coefficient of Friction | 0.40 | 0.29 | 0.40 | 0.29 |
| Driven Pulley | Grooved | Grooved | Non-grooved | Non-grooved |
| Pulley Coating | None | None | Sanotprene[2] | Santoprene[2] |
| Coefficient of Friction | NA | NA | 0.47 | 0.47 |
| Noise at Tooth engagement frequency, dB | 74.9 | 82.7 | 79.2 | 70.8 |
| Total Noise, dB | 86.9 | 88.3 | 87.7 | 86 |

[1]Solef ™: polyvinyldiene fluoride available from Solvay, Brussels, Belgium.
[2]Santoprene ™: EPDM and polypropylene blend available from Advanced Elastomer Systems, Akron, Ohio, USA; Shore A hardness range 35–80.

System 1 is what may be considered a conventional drive system, having both uncoated grooved driver and driven pulleys. As discussed above, the coefficient of friction between the driver pulley and the belt is within the range of 0.20 to 0.45. The belt facing material is a conventional HDPE having a coefficient of friction that results in reduced abrasion of the belt. The noise at the tooth engagement frequency was 74.9 dB and total noise for the three component system was 86.9 dB.

System 2, with grooved driven pulley, was modified by forming the belt surface with a lower coefficient of friction material, though the coefficient of friction between the driver pulley and the belt is still within the desired range of 0.20 to 0.45. The noise at the tooth engagement frequency was 82.7 dB, with total noise of 88.3 dB; an increase in the tooth noise of about 10%, and an increase in the total noise of almost 2%.

System 3 was comprised of the belt formed with a conventional belt surface material and was instead run on a driven pulley coated with a high coefficient of friction material. The noise level at the tooth engagement frequency increased by about 5.5%, with a total noise increase of just under 1%. The interaction between the belt coating material and the pulley coating material increased the noise level at the tooth engagement frequency. It is believed that this is caused by the similarities in the two materials. The only difference between the Santoprene, a mixture of EPDM and polypropylene, and HDPE, a polyethylene, is the one carbon atom in the length of the monomer. When the materials contact, a Velcro-like action takes place, resulting in an increase in noise. While the total noise of System 3, as compared to the conventional System 1, is acceptable for the present invention, as the goal of reducing drive system space with a flangeless driven pulley is achieved, reduced noise at the driven pulley is also desired.

System 4 used a low coefficient of friction material for the belt coating and a high coefficient of friction for the surface of the crownless pulley. The system had a decrease in noise at the driven belt of almost 5.5%, and a total noise reduction by just over 1%. System 4 achieves both desired goals; reduced space and reduced noise.

Variations in the present invention are possible in light of the description provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the fill intended scope of the invention as defined by the following appended claims.

What is claimed is:

1. A drive system comprising a driver pulley, a driven pulley (22), and a belt (10), the belt (10) having a pulley engaging surface (16) comprised of a plurality of transversely extending teeth (18) having a self-tracking profile causing the belt to track to only a single path when traveling on a correspondingly grooved pulley, and the driven pulley (22) has a non-grooved, crownless belt engaging surface (24), the combination being characterized by:

the material (20) forming the pulley engaging surface (16) of the belt (10) having a coefficient of friction, the material (28) forming the belt engaging surface (24) of the driven pulley (22) having a coefficient of friction greater than the coefficient of friction of the pulley engaging surface (16) of the belt (10), and the dynamic coefficient of friction between the driven pulley (22) and the belt (10) is greater than a dynamic coefficient of friction between the driver pulley and the belt (10).

2. A drive system in accordance with claim 1 wherein the driven pulley (22) is flangeless.

3. A drive system in accordance with claim 1 wherein the material (20) forming the pulley engaging surface (16) of the belt (10) has a coefficient of friction of not more than 0.45.

4. A drive system in accordance with claim 1, wherein the material (28) forming the belt engaging surface (24) of the driven pulley (22) has a coefficient of friction of 0.45 or greater.

5. A drive system in accordance with claim 1 wherein the driver pulley and the belt (10) have a dynamic coefficient of friction of 0.20 to 0.45.

* * * * *